United States Patent [19]

Dolan et al.

[11] 3,893,332

[45] July 8, 1975

[54] LEAKAGE TEST SYSTEM

[75] Inventors: Terry M. Dolan, Bremerton; Michael G. Leedy, Poulsbo, both of Wash.

[73] Assignee: The United States of America as represented by the Secretary of the Navy, Washington, D.C.

[22] Filed: Feb. 21, 1974

[21] Appl. No.: 444,576

[52] U.S. Cl. ................................. 73/40; 73/49.2
[51] Int. Cl. ................................................ G01m 3/26
[58] Field of Search ............. 73/40, 168, 49.2, 49.3

[56] References Cited
UNITED STATES PATENTS

| | | | |
|---|---|---|---|
| 2,403,897 | 7/1946 | Aller | 73/40 |
| 2,924,965 | 2/1960 | Westerheim | 73/40 |

FOREIGN PATENTS OR APPLICATIONS

| | | | |
|---|---|---|---|
| 1,301,851 | 1/1973 | United Kingdom | 73/40 |
| 978,221 | 11/1950 | France | 73/40 |
| 2,013,263 | 2/1969 | France | 73/40 |

Primary Examiner—Jerry W. Myracle
Assistant Examiner—John S. Appleman
Attorney, Agent, or Firm—R. S. Sciascia; Charles D. B. Curry

[57] ABSTRACT

A method and apparatus for determining the quantity of compressed gas that is escaping from an enclosed volume. A sample of the gas at the enclosed volume pressure is taken from the enclosed volume. The sample is applied to one side of a differential pressure gage. The gas of the enclosed volume is then connected to the other side of the differential pressure gage and to a gas source that is maintained at a pressure greater than the pressure of the enclosed volume. Gas is added from the gas source to the enclosed volume to maintain a zero differential pressure on the differential pressure gage. The flow rate of the gas from the gas source is measured over a relatively short period of time which indicates the leakage of the enclosed volume.

6 Claims, 1 Drawing Figure

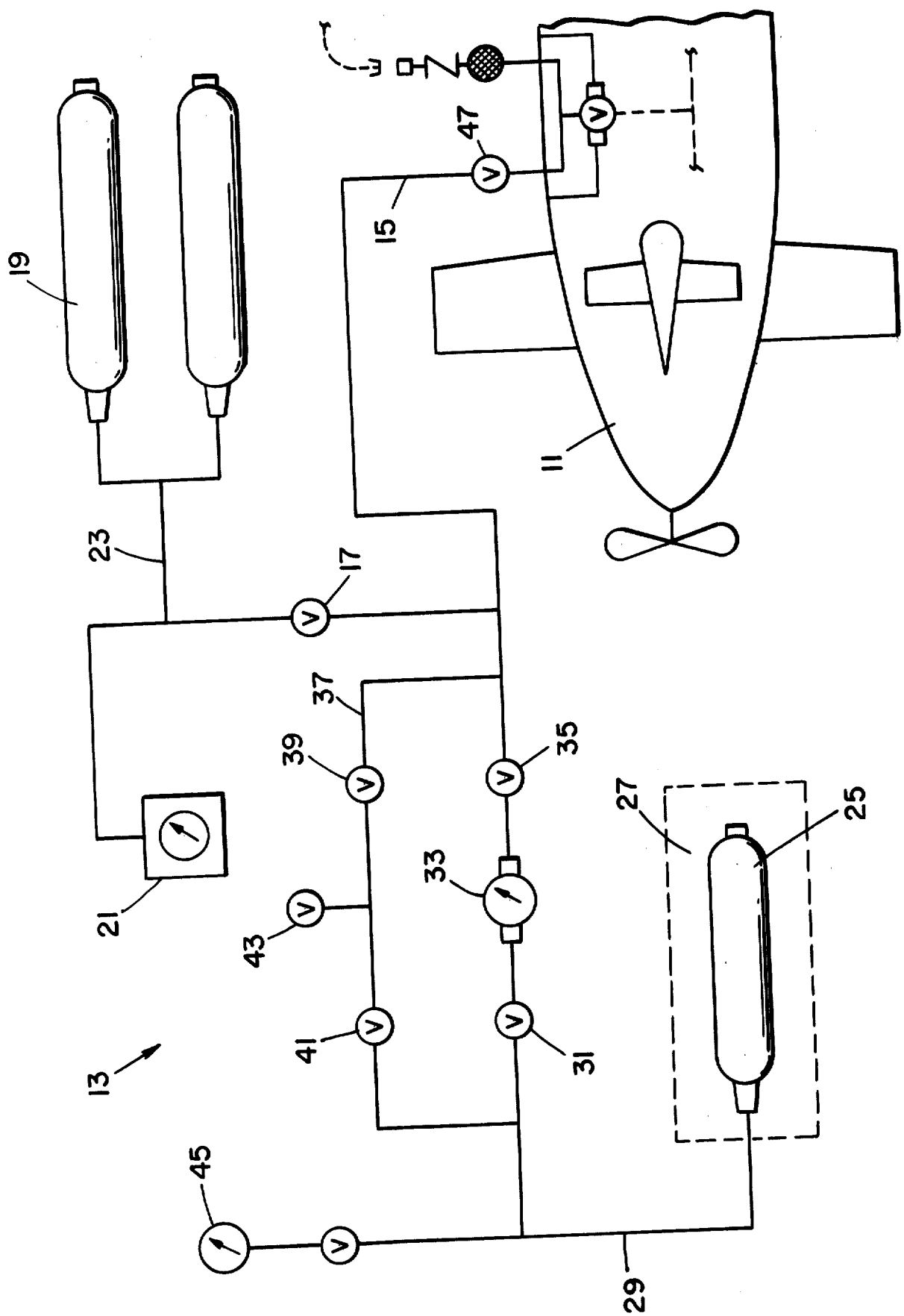

LEAKAGE TEST SYSTEM

STATEMENT OF GOVERNMENT INTEREST

The invention described herein may be manufactured and used by or for the Government of the united States of America for governmental purposes without the payment of any royalties thereon or therefor.

BACKGROUND OF THE INVENTION

1. Field of the Invention

The present invention is related to leakage test apparatus and more particularly to the method and apparatus for determining the quantity of compressed gas that is escaping from a relatively large enclosed volume.

2. Description of the Prior Art

One of the major problems encountered in detecting the quantity of compressed gas that is escaping from a relatively large enclosed volume is the effect of ambient temperature change which causes a temperature change of the compressed gas. That is, in the past the volume of escaping gas has been measured by the change in system pressure over a long period of time. To calculate the system loss by this technique both the system volume and the average system temperature change must be known quite accurately. An example of this required accuracy is illustrated by the fact that in a system pressure at about 4500 psi and at 70°F, a temperature variation of about 1°F will result in a pressure change of approximately 9 psi. Many attempts have been made to very accurately measure these temperature changes in the various points within the system. However, this becomes very difficult when the system is large and has an uneven temperature distribution such as may be encountered on a submarine. To detect small leaks within large systems long duration tests have been required to detect sufficient measurable pressure changes. A major problem encountered with this type of testing is that measured pressure changes result from undetected or inaccurately measured temperature changes rather than from system leaks. The present invention overcomes these disadvantages by increasing the accuracy and minimizing the test time duration. This is achieved by minimizing the effect of temperature changes and the resulting pressure changes.

SUMMARY OF THE INVENTION

Briefly, the present invention relates to leakage test apparatus and a method that minimizes the time duration and the effect of temperature changes in mesuring the quantity of a compressed gas that is escaping from a relatively large enclosed system. This is achieved by adding a compressed gas into the system at a predetermined rate to maintain constant system pressure. Knowing the time duration of the test and the flow rate of the compressed gas introduced into the system it is possible to very accurately determine system leakage losses by the relationship $V = RT$ where $V =$ volume of introduced gas added during test duration $R =$ rate of introduced gas during test duration $T =$ time of test duration It should be particularly noted that the test time duration is relatively short, such as 15 minutes. In this manner it has been found that system temperature changes are so small that they can be ignored.

In accordance with the method and apparatus of the present invention a sample of the gas at the enclosed volume pressure is taken from the enclosed volume. The sample is applied to one side of a differential pressure gage. The gas of the enclosed volume is then connected to the other side of the differential pressure gage and to a gas source that is maintained at a pressure greater than the pressure of the enclosed volume. Gas is added from the gas source to the enclosed volume to maintain a zero differential pressure on the differential pressure gage. The flow rate of the gas from the gas source is measured over a relatively short period of time which indicates the leakage of the enclosed volume.

STATEMENT OF THE OBJECTS OF THE INVENTION

An object of the present invention is to provide a leakage test method that is accurate and reliable.

Another object of the present invention is to provide a leakage test apparatus that is accurate and reliable.

Still another object of the present invention is to provide an apparatus and method for determining the quantity of a compressed gas that is escaping from a relatively large enclosed volume or system.

A further object of the present invention is to provide an apparatus and method that minimize the time duration and effect of temperature changes in measuring the leakage losses of an enclosed pressurized system.

Other objects, advantages and novel features of the present invention will become apparent from the following detailed description of the invention when considered in conjunction with the accompanying drawings wherein:

BRIEF DESCRIPTION OF THE DRAWING

FIG. 1 is a schematic drawing of the leakage test apparatus for practice of the method of the present invention.

DESCRIPTION OF THE PREFERRED EMBODIMENT

In FIG. 1 is illustrated a schematic diagram of one embodiment of apparatus that may be engaged in practice of the method of the present invention. In this drawing is illustrated a ship 11, for example, that has an enclosed system, such as tanks, pipes and valves, that has a large volume (for example, greater than about 500 ft³) of highly compressed (for example, greater than 1,000 psi) gas such as air. The test apparatus 13 is directly connected into the system by conduit 15. Conduit 15 is connected through throttle valve 17 to tank 19 which contains a gas at a pressure greater than the pressure of the gas in the system being tested. A flow rate measuring device 21, which preferably continuously measures and records the flow rate, is connected to conduit 23 upstream of valve 17. It is to be understood that measuring device 21 may be employed in conduit 15 rather than in conduit 23. A tank 25 of small volume, such as one cubic foot to improve portability, is preferably enclosed in insulated material 27. The outlet of this tank 25 is connected through conduit 29 and valve 31 to one side of differential pressure gage 33. The other side of differential pressure gage 33 is connected through valve 35 to conduit 15. A bypass conduit 37 is employed to bypass gage 33. Valves 39 and 41 are employed in this bypass conduit 37 and a bleed valve 43 is also employed to allow for depressurization of the system. A pressure gage 45 may be employed to measure the pressure of the gas in tank 25.

Operation of leakage test apparatus 13 is as follows: Prior to connecting the test apparatus to the system to be tested all of valves 17, 31, 35, 39 and 41 are closed. Valve 47, which is not part of the test apparatus, is also closed. Conduit 15 of the test apparatus is connected to the outlet of valve 47. Valves 47, 39 and 41 are then opened and tank 25 is filled with gas from the system to be tested at the system pressure. Then valves 39 and 41 are closed and valves 31 and 35 are opened. If the system to be tested has no leaks, then differential pressure gage 33 will register zero differential pressure. However, if the system has a leak then the system pressure will drop and differential pressure gage will show a differential pressure. To measure the leak rate, valve 17 is opened that amount required to maintain differential pressure gage 33 at zero. That is, the amount of gas added to the system from tank 19 represents the leakage from the system. Therefore, the reading on flow rate meter 21 accurately represents the leakage flow rate. The leakage volume can be obtained by multiplying the flow rate times the test time duration. The test is normally taken over a relatively short period of time, such as 15 minutes or less, to minimize the temperature change of the gas in the system.

What is claimed is:

1. A leakage test apparatus comprising:
   a. first means for sampling and containing at a first predetermined pressure a gas contained in an enclosed volume at a first predetermined pressure;
   b. second means for comparing the pressure of said gas contained in said first means with the pressure of the gas contained in said enclosed volume over a predetermined time duration;
   c. third means for adding supplementary gas to the gas contained in said enclosed volume to maintain the pressure of the gas contained in said enclosed volume at said first predetermined pressure; and
   d. fourth means for measuring the amount of supplementary gas added to said enclosed volume during said predetermined time duration.

2. The apparatus of claim 1 wherein:
   a. said first means comprises a first container;
   b. said second means comprises a differential pressure gage;
   c. said third means comprises a second container containing a gas at a pressure above said first predetermined pressure; and
   d. said fourth means comprises a flow rate meter.

3. The apparatus of claim 2 wherein:
   a. said first container is operatively connected to one side of said differential pressure gage;
   b. a first conduit one end of which is operatively connected to the other side of said differential pressure gage and the other end of which is for being operatively connected to said enclosed volume;
   c. said second container is operatively connected to said first conduit; and
   d. said flow rate meter is operatively connected to the output of said second container.

4. The apparatus of claim 3 including:
   a. a bypass conduit operatively interconnecting said one and said other sides of said differential pressure gage.

5. The apparatus of claim 4 including:
   a. first and second valves operatively connected in series in said bypass conduit.

6. The apparatus of claim 5 including:
   a. a third valve operatively connected to atmosphere and to said bypass conduit between said first and second valves.

* * * * *